United States Patent
Mehta et al.

(10) Patent No.: US 8,788,436 B2
(45) Date of Patent: Jul. 22, 2014

(54) UTILIZATION OF FEATURES EXTRACTED FROM STRUCTURED DOCUMENTS TO IMPROVE SEARCH RELEVANCE

(75) Inventors: Rupesh Rasiklal Mehta, Andhra Pradesh (IN); Sree Hari Nagaralu, Andhra Pradesh (IN); Anjana Das, Andhra Pradesh (IN); Bhaskar Mitra, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 13/191,486

(22) Filed: Jul. 27, 2011

(65) Prior Publication Data

US 2013/0031032 A1    Jan. 31, 2013

(51) Int. Cl.
*G06K 9/32* (2006.01)
*G06F 17/30* (2006.01)

(52) U.S. Cl.
CPC .............. *G06K 9/325* (2013.01); *G06K 9/3233* (2013.01); *G06F 17/30908* (2013.01); *G06F 17/30911* (2013.01)
USPC .................. 706/12; 706/16; 706/25; 706/26; 707/770; 707/776; 707/777; 707/778

(58) Field of Classification Search
USPC ......................................................... 706/12
See application file for complete search history.

(56) References Cited

U.S. PATENT DOCUMENTS

| 6,606,625 B1* | 8/2003 | Muslea et al. ........................ 1/1 |
| 2002/0078045 A1* | 6/2002 | Dutta ................................. 707/7 |
| 2006/0010126 A1 | 1/2006 | Anick et al. |
| 2007/0038931 A1* | 2/2007 | Allaire et al. ................. 715/526 |
| 2009/0259651 A1 | 10/2009 | Tankovich et al. |
| 2009/0327264 A1 | 12/2009 | Yu et al. |
| 2010/0057717 A1 | 3/2010 | Kulkarni |
| 2010/0131563 A1 | 5/2010 | Yin |
| 2010/0228738 A1 | 9/2010 | Mehta et al. |
| 2010/0257440 A1 | 10/2010 | Kshirsagar et al. |

FOREIGN PATENT DOCUMENTS

JP    2001117942 A    4/2001

OTHER PUBLICATIONS

U.S. Appl. No. 12/367,634, filed Feb. 2009, Kulkarni.*
"International Search Report", Mailed Date: OCt. 29, 2012, Application No. PCT/US2012/047857, Filed Date: Jul. 23, 2012, pp. 1-8.

(Continued)

*Primary Examiner* — Jeffrey A Gaffin
*Assistant Examiner* — Nathan Brown, Jr.
(74) *Attorney, Agent, or Firm* — Dave Ream; Jim Ross; Micky Minhas

(57) ABSTRACT

Features automatically extracted from semi-structured web pages are utilized by a search engine to rank documents that include semi-structured web pages. These features include, but are not limited to, a number of reviews, a number of positive reviews, and/or a number of negative reviews from a web page that includes user reviews. These features also include a number of views of a video that is viewable by way of a semi-structured web page. The features also include a number of subscribers to broadcasts of an individual from a social networking web page and a number of contacts of an individual listed on a social networking web page.

20 Claims, 11 Drawing Sheets

(56) References Cited

OTHER PUBLICATIONS

Gulhane, et al., "Web-scale information extraction with vertex", Retrieved at <<http://ieeexplore.ieee.org/stamp/stamp.jsp?tp=&arnumber=5767842>>, Proceedings of 27th IEEE International Conference on Data Engineering, Apr. 11-16, 2011, pp. 1209-1220.

Kumar, et al., "Efficient Approaches for Record level Web Information Extraction Systems", Retrieved at <<http://steps-india.com/ijaea/IJAEA-Jan-2011-II-14.pdf>>, Proceedings of International Journal of Advanced Engineering & Application, Jan. 2011, pp. 161-164.

Pol, et al., "A Survey on Web Content Mining and extraction of Structured and Semistructured data", Retrieved at <<http://ieeexplore.ieee.org/stamp/stamp.jsp?arnumber=04579960>>, Proceedings of Intrnational Conference on Emerging Trends in Engineering and Technology, Jul. 16-18, 2008, pp. 543-546.

Yin, et al., Automatic Extraction of Clickable Structured Web Contents for Name Entity Queries, Retrieved at <<http://research.microsoft.com/pubs/120887/fp0254-yin.pdf>>, Proceedings of the 19th International Conference on World Wide Web, Apr. 26-30, 2010, pp. 991-1000.

Zheng, et al., "Efficient Record-Level Wrapper Induction", Retrieved at <<http://clgiles.ist.psu.edu/pubs/CIKM2009-wrapper-induction.pdf>>, Proceddings of the 18th ACM Conference on Information and Knowledge Management, Nov. 2-6, 2009, pp. 45-55.

\* cited by examiner

UTILIZATION OF FEATURES EXTRACTED FROM STRUCTURED DOCUMENTS TO IMPROVE SEARCH RELEVANCE

BACKGROUND

A Web search engine is a computer implemented system that is configured to search for information that is available on the World Wide Web and FTP servers. In operation, a search engine receives a query issued by a user and performs a search over documents indexed by the search engine based at least in part upon the query. The goal of the search engine is to provide the user with documents that are most relevant to the information retrieval intent of the user. Types of documents that can be searched over and provided to the user include web pages, images, data from news feeds, etc.

Search engines desire to provide users with most relevant search results, and utilize relatively complex algorithms to output a ranked list of documents responsive to receipt of a query. A most highly ranked document (a document believed by the search engine to be most relevant to the information retrieval intent of the user) is presented most prominently to the user, typically as the top-most search result in a list of search results. Search results believed to be less relevant to the information retrieval intent of the user when compared to the most relevant search result are presented lower in the ranked list of search results.

Accurately determining which search results are most important to the user is an extremely important task, as generally users will not analyze a large number of search results to find a document that is most relevant to the information retrieval intent of the user. Rather, if the user does not quickly see a search result that is believed to be relevant to her informational intent, the user will most likely give up searching for such information, recast the query, or attempt to use another search engine to locate desired information. As revenue is generated in search engines based upon advertising fees, it is imperative that search engines determine ranking of documents accurately with respect to information retrieval intent of a user to retain traffic and attract new users.

SUMMARY

The following is a brief summary of subject matter that is described in greater detail herein. This summary is not intended to be limiting as to the scope of the claims.

Described herein are various technologies pertaining to ranking documents that are retrieved by a search engine responsive to receipt of a query from a user. The World Wide Web has numerous web pages thereon that are semi-structured in nature. That is, content of the semi-structured web pages does not conform to a standard relational database schema, but nevertheless includes certain patterns of content that can be recognized. For example, a web site of a retailer may include a plurality of web pages, wherein each web page in the plurality of web pages is configured to sell or describe a product. While two web pages in the web site are directed towards different products, the structure and layout of the two web pages (along with other web pages belonging to the web site) may be substantially similar.

For instance, each web page may have, respectively, an image of a product at a certain location, a title of a product at a certain location, reviews of the product at a certain location, etc. In another example, a web site may include a plurality of web pages that are configured to present various videos to users thereof. Therefore, while each web page in such web site displays a different video, each of the web pages may include a title of the respective video at a certain location, a number of views of the video at a certain location, comments pertaining to the videos at a certain location, etc. Moreover, a social networking web site may include a plurality of web pages that are configured to present profiles for numerous different users of the social networking web site. Again, while each web page may display information about a different user, certain features, such as an identity of the user, an image of the user, a biography of the user, a number of contacts of the user, etc., may be in similar locations across web pages of such web site.

Generally, search engines fail to consider content on a web page that is independent of content of a query issued by the user when determining how to rank web pages responsive to receipt of a query. In an exemplary embodiment, a search engine described herein may output a ranked list of search results that includes at least one semi-structured web page, wherein the position of the semi-structured web page in the ranked list of search results is based at least in part upon a value of a feature displayed to users of the web page that is independent of content of a query. Pursuant to an example, the semi-structured web page may be a web page that is configured to display information about a particular product. Exemplary features that can be taken into consideration when determining position of such web page responsive to receipt of a query can include a number of reviews posted on such web page by purchasers of the product, a number of positive reviews posted on the web page by purchasers of the product, and/or a number of negative reviews posted on the web page by purchasers of the product. Therefore, in an example a user may proffer the query "camera" to a search engine, and the search engine can retrieve two different semi-structured web pages that describe (and possibly sell) two different respective cameras. The web page that describes the camera with a greater number of positive reviews may be positioned in the search results above the web page that describes the camera with fewer positive reviews or more negative reviews.

In another exemplary embodiment, a semi-structured web page may be configured to present a video to a user. A position of such web page in a ranked list of search results may be based at least in part upon a number of users that have viewed such video as indicated at a certain location on the web page. Therefore, for instance, a user may issue a query that matches the title of two different videos that are displayed on two different semi-structured web pages. The search engine may present the two web pages in a ranked list of search results such that the web page that includes the video with the greater number of views is presented higher in the ranked list of search results than the web page that includes the video with fewer number of views. In still yet another exemplary embodiment, a semi-structured web page may include profile information of an individual, wherein the profile information may include a name of the individual, a location of the individual, interests of the individual, as well as a number of contacts (friends) of the individual. The search engine, responsive to receipt of a query, can cause a semi-structured web page that includes such profile information to be positioned in a ranked list of search results based at least in part upon the number of contacts of the individual.

For the search engine to consider this information, numerous pre-processing steps can be undertaken. First, features (also referred to as signals) that may be desirably employed by the search engine when ranking search results can be identified, wherein such features may be common across certain semi-structured web pages. These features may be ascertained, for instance, through programmatic analysis of query logs of a search engine. For instance, through programmatic analysis of queries submitted to a search engine, it can be ascertained that the term "review" is often proffered by users, and that many semi-structured web pages include such term. Alternatively, features that may be relevant to the ranking of search results can be manually indicated through analysis of popular web sites that include semi-structured web pages. For example, a popular social networking site may include semi-structured web pages that each comprise a number of contacts of respective individuals. Once such features have been identified, semi-automated wrapper induction techniques can be employed to automatically identify the existence of these features across a plurality of similar semi-structured web pages.

Subsequent to the features having been identified across the plurality of semi-structured web pages, machine learning techniques can be employed to learn a scoring function that assigns scores to the features, wherein the scores are indicative of importance of features with respect to position of web pages that include the features in a ranked list of search results. For example, a regression tree model can be used to learn a scoring function over a set of extracted features and values, thereby assigning an importance score to the feature across numerous semi-structured web pages. These scores may be fed into a ranker (that ranks search results) for training the ranker together with other features that are conventionally used by such ranker when outputting a ranked list of search results.

Other aspects will be appreciated upon reading and understanding the attached figures and description.

DETAILED DESCRIPTION

Figure 1:
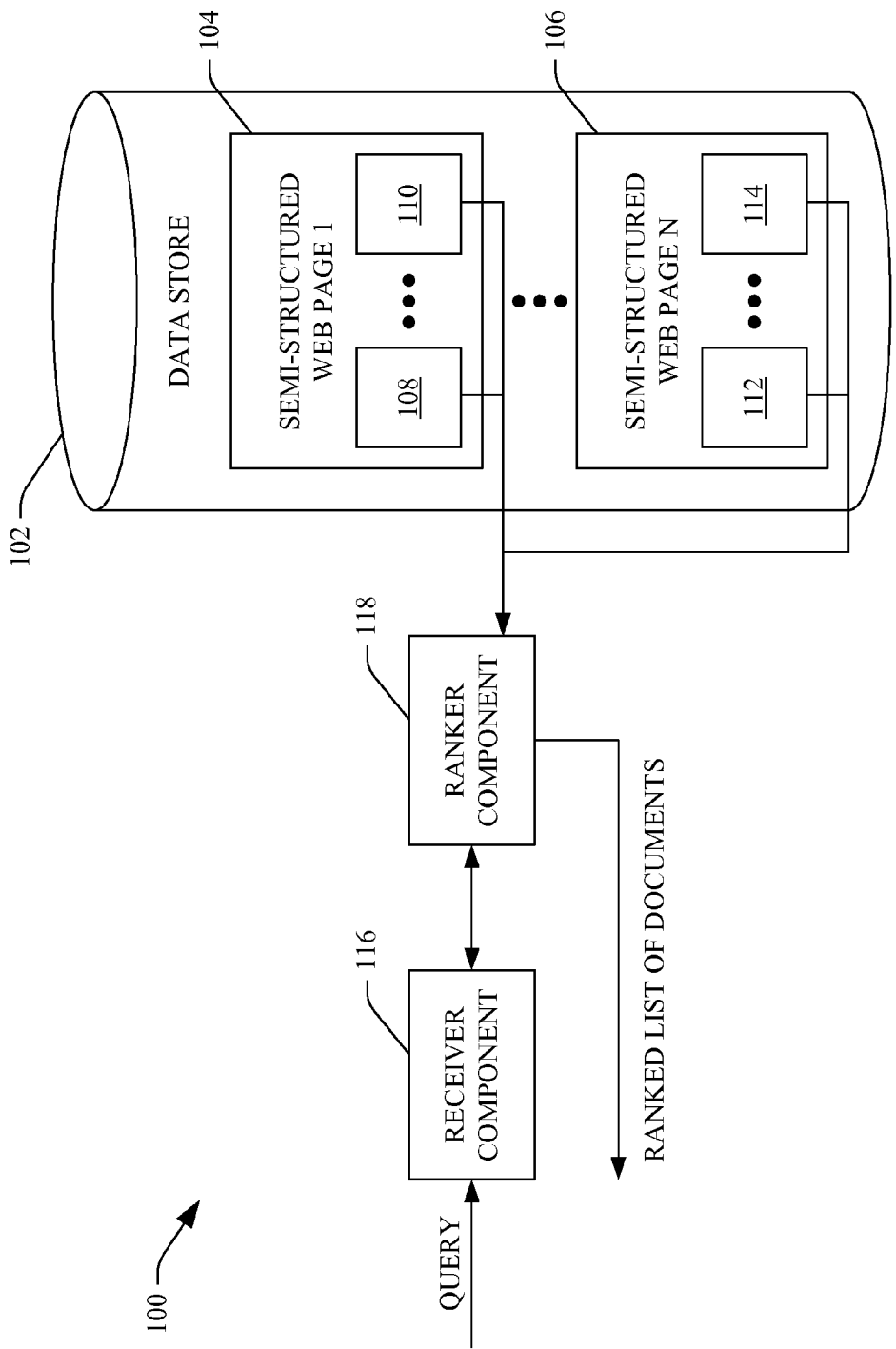
FIG. 1 is a functional block diagram of an exemplary system that facilitates outputting a ranked list of documents to a user.

Various technologies pertaining to outputting a ranked list of documents responsive to receipt of a query will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates outputting a ranked list of documents responsive to receipt of a query from a user is illustrated. The system 100 includes a data store 102 that retains a plurality of documents that are retrievable by a general purpose search engine. For example, the data store 102 may be a hard drive resident upon a server, a portion of memory, or other suitable hardware data storage device. Contents of the data store 102 can include web pages, images, videos, documents, applications, or other suitable entities that can be retrieved by a search engine. At least some of the documents included in the data store 102 are semi-structured web pages.

For instance, the data store 102 can include a first semi-structured web page 104 through an Nth semi-structured web page 106. As used herein, a semi-structured web page is a web page with content that fails to conform to the structure of a relational database, but nevertheless comprises a pattern that is consistent across a plurality of other semi-structured web pages. Examples of semi-structured web pages include web pages belonging to a web site of a retailer, wherein such web pages are directed towards different products that are for sale from the retailer (but have a consistent pattern). For instance, a web page directed towards the sale of a first product may have an image, a title, reviews, description, etc. in certain positions on such web page, and a second web page belonging to such web site directed towards the sale of a second product may likewise have an image, a title, reviews, description, etc. in corresponding positions on such second web page. Therefore, the first semi-structured web page 104 may include a first feature 108 through an Mth feature 110, and the Nth semi-structured web page 106 may include a first feature 112 and an Mth feature 114, wherein the first feature 108 of the first semi-structured web page 104 corresponds to the first feature 112 of the Nth semi-structured web page 106 (e.g., both portions describe different products pertaining to the first and Nth semi-structured web pages 104 and 106, respectively) and the Mth feature 110 of the first semi-structured web page 104 corresponds to the Mth feature 114 of the Nth semi-structured web page 106 (e.g., the Mth feature 110 of the first semi-structured web page 104 is a number of reviews posted by purchasers of a first product displayed in the first semi-structured web page 104 while the Mth feature 114 of the Nth semi-structured web page 106 is a number of reviews posted by purchasers of an Nth product depicted in the Nth semi-structured web page 106).

Features that are consistent across semi-structured web pages may have some bearing on the relevance of the semi-structured web pages to a query set forth by a user of a search engine. Identities of such features may be learned, for example, through analysis of query click logs of a search engine. Programmatic analysis of query logs of a search engine may indicate that, for example, users often type queries supplemented with the term "reviews" when searching for information pertaining to a particular product. It may therefore be inferred that reviews of a product may be important generally to those that search for products. In another example, through programmatic analysis of query logs and corresponding click logs, it can be ascertained that generally when a searcher performs a search for a particular person that may have a common name (e.g., John Smith), the person with such common name that has the most number of friends in a social networking site may be the profile that is most often selected by searchers. Accordingly, through analysis of web sites that include several semi-structured web pages (such that consistent patterns can be located for particular features) and/or analysis of query logs and/or click logs, features in semi-structured web pages that may have some bearing on the relevance of the semi-structured web page with respect to one or more queries can be determined.

A list of features that can be extracted from various different types of semi-structured web pages that can be employed by a search engine when positioning semi-structured web pages amongst a ranked list of documents is provided below. This list, however, is exemplary in nature and is not intended to limit the scope of the hereto-appended claims. In a first example, a semi-structured web page may belong to a retailer web site and may be configured to describe and sell a certain product. Features on such semi-structured web page that can be utilized by a search engine when positioning the semi-structured web page amongst a ranked list of documents (and that are consistently located across numerous semi-structured web pages belonging to the aforementioned web site) may include, but are not limited to, a number of reviews posted on the web page by purchasers of the product, a number of positive reviews posted on the web page by purchasers of the product, a number of negative reviews posted on the web page by purchasers of the product, a number of positive terms included in reviews posted on the web page by purchasers of the product (great, fantastic, happy, etc.), a number of negative terms posted on the web page by purchasers of the product (poor, bad, lack, etc.), amongst other features.

In another example, a semi-structured web page in the data store 102 may belong to a web site that is configured to display various videos to users, wherein different web pages belonging to the web site display different videos. Features that can be employed by a search engine when positioning the semi-structured web page in a ranked list of documents (responsive to receipt of a query) that can be extracted from the semi-structured web page (and that exist across a plurality of semi-structured web pages belonging to the web site) may include: a number of views of the video displayed on the web page; a number of comments posted by viewers of the video displayed on the web page; a number of positive comments posted by viewers of the video on the web page, a number of negative comments posted by reviewers of the video displayed on the web page, a number of positive terms in the comments, a number of negative terms in the comments, etc. Comments can be labeled as positive or negative through natural language processing techniques, for example.

In still yet another exemplary embodiment, a semi-structured web page that may be included in the data store 102 may belong to a social networking web site, wherein such semi-structured web page is a profile page that depicts biographical information of a certain individual or entity. An exemplary feature that can be employed by a search engine to position the web page amongst a ranked list of documents is a number of contacts or friends of the entity that is profiled in the profile page. In still yet another example, a semi-structured web page that is included in the data store may belong to a social networking web site that is configured to allow users thereof to broadcast messages to numerous followers or subscribers. Accordingly, a semi-structured web page belonging to such web site may include an identity of the poster or broadcaster of information, as well as a number of subscribers (followers) that subscribe to broadcasts of such entity. The number of subscribers on the semi-structured web page can be indicative of relevance of the web page with respect to a query. For example, two different broadcasters may broadcast under the name John Doe. The first of the two John Does may have a relatively small number of subscribers or followers, while the second of the John Does may have a relatively large number of subscribers or followers. In the general case, one searching for John Doe may be more likely interested in web page of the John Doe with the greater number of followers or subscribers. While several exemplary semi-structured web pages and features have been described, it can be ascertained that the data store 102 may include numerous different semi-structured web pages that have various features that can be extracted autonomously from the semi-structured web pages, and that these features may be indicative of relevance of a semi-structured web page with respect to a query proffered by a user of a search engine.

The system 100 additionally comprises a receiver component 116 that receives a query set forth by a user. The query may be for a particular product, for a particular person, for a certain video, for a certain image, etc. A ranker component 118 is in communication with the receiver component 116 and performs a search over contents of the data store 102 using the query received by the receiver component 116. The ranker component 118 is configured to selectively retrieve documents from the data store 102 and rank documents that are deemed to be relevant to the query. In other words, the ranker component 118 outputs a ranked list of documents responsive to receipt of a query. The ranker component 118 can generate the ranked list of documents through analysis of features corresponding to such documents, including but not limited to, text in the documents, fonts utilized to describe or emphasize text in documents, position of certain text on web pages is relevant to the query, etc.

Additionally, the ranked list of documents returned to the issuer of the query can include at least one of the semi-structured web pages 104-106 in the data store 102 at a particular position in the ranked list of documents. The ranker component 118 can selectively position the at least one semi-structured web page in the ranked list of documents based at least in part upon a value of a feature (signal) that is at a learned location in the semi-structured web page. As will be described below, wrapper induction can be employed to learn a wrapper that automatically extracts features on semi-structured web pages, including the features 108-114 on the semi-structured web pages 104-106, respectively. Furthermore, the value of the feature that is used by the ranker component 118 to selectively position the semi-structured web page amongst the ranked list of search results can be independent of any correlation between content of the query. That is, the value of the feature that is at the learned location in the semi-structured web page may have no correlation to the text that is included in the query.

Pursuant to an example, the query received by the receiver component may be "camera." The first semi-structured web page 104 may be configured to describe and sell a first camera while the Nth semi-structured web page 106 may include content that describes and sells a second camera. The first feature 108 on the first semi-structured web page 104 may be positive reviews, and a value of the first feature 108 may be a number of positive reviews posted on the first semi-structured web page 104 by purchasers of the first camera. Similarly, the first feature 112 on the Nth semi-structured web page 106 may be positive reviews, and a value of the first feature 112 on the Nth web page 106 can be a number of positive reviews posted on the Nth web page 106 by purchasers of the second camera. In an example, the value of the first feature 108 of the first web page 104 can be 100, while the value of the first feature 112 on the Nth web page can be 10. The ranker component 118 may therefore position the first semi-structured web page 104 higher in the ranked list of documents than the Nth semi-structured web page 106 based at least in part upon the feature values (10 and 100) which have no correlation to the query "camera" that was issued by the user.

In addition to utilizing values of features extracted from semi-structured web pages, the ranker component 118 can also consider learned relationships between features on semi-structured web pages. For instance, a semi-structured web page describing an automobile can include a first feature that identifies the make and model of the automobile, and a second feature that identifies fuel efficiency of the automobile. Conventionally, search engines "understand" each feature individually, but do not contemplate utilizing an understanding of a relationship between the features to rank search results responsive to receipt of a query. In an example, query/click logs can be programmatically analyzed, and it can be ascertained that searchers often issue queries that include terms for the make and model of an automobile followed by the term "fuel efficiency." As certain semi-structured web pages have consistent layouts therebetween, an understanding can be learned between features across semi-structured web pages, and the ranker component 118 can employ such understanding to selectively position web pages in a ranked list of documents.

While several examples of semi-structured documents have been set forth above, it is to be understood that such examples are not intended to be a comprehensive list or limit the scope of the claims. Aspects described herein can be employed in connection with searching for images that are in some way semi-structured in nature, searching for music/lyrics, searching for applications that can be executed on a computing device (such as a portable telephone), etc. Additionally, aspects described herein can be employed in environments other than the World Wide Web, such as over enterprise data stores that include numerous semi-structured documents, and the like.

Figure 2:
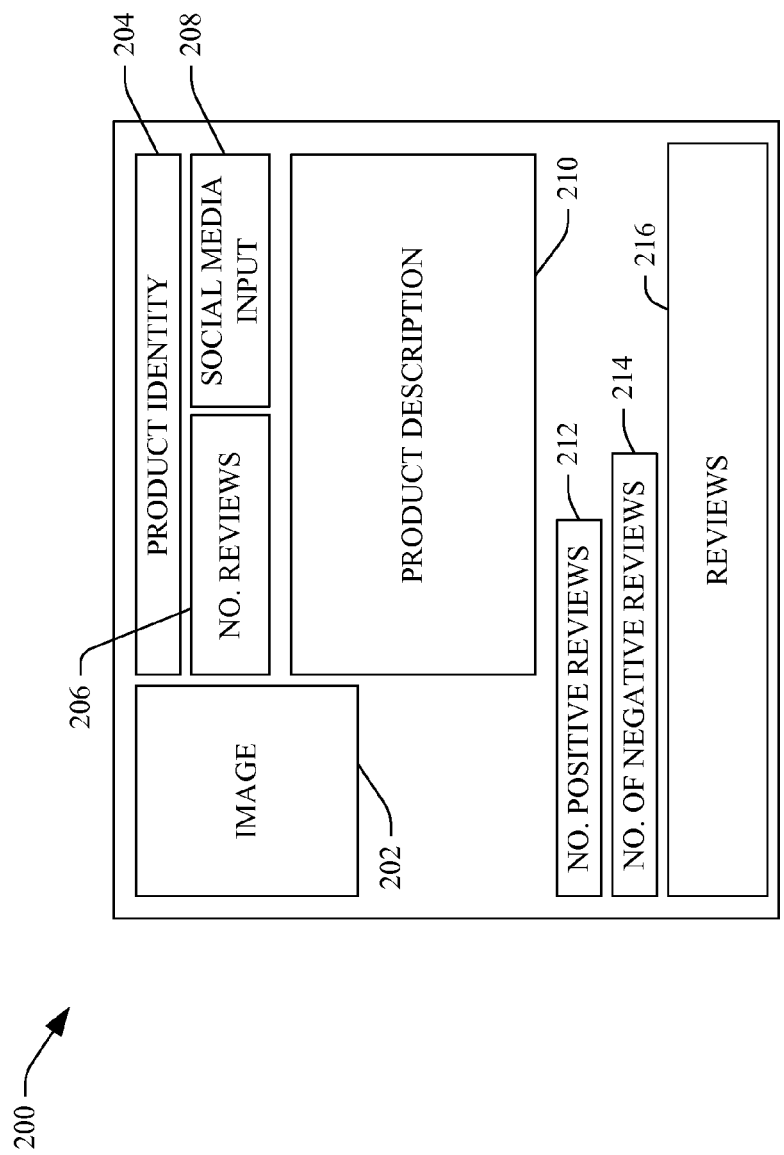
FIG. 2 illustrates an exemplary semi-structured web page that includes information pertaining to a product.

Referring now to FIG. 2, an exemplary semi-structured web page 200 is illustrated. The semi-structured web page 200 belongs to a retailer web site that is configured to sell products. The semi-structured web page 200 is shown in template form, as a plurality of semi-structured web pages belonging to the retailer web site (or another retailer web site) will have a substantially similar layout. The semi-structured web page 200 includes an image 202 that is located in an upper left-hand portion of the semi-structured web page 200. The semi-structured web page 200 further includes a feature "product identity" 204, which may be a name and or model number of a product that is described on the semi-structured web page 200. A feature "number of reviews" 206 may have a value that indicates a number of purchasers of the product that have posted reviews on the web page 200. This feature may be located, for instance, immediately beneath the product identity 204 on the left-hand side of the product identity 204 and to the right of the image 202. A feature "social media input" 208 can indicate a number of times that members of a particular social media web site have indicated that they approve of the product. The social media input 208 may be positioned immediately to the right of the number of reviews 206.

Beneath the number of reviews 206 and the social media input 208 and near the center of the semi-structured web page 200, a product description 210 can be displayed, wherein the product description 210 can describe attributes corresponding to the product identified by the product identity 204. Beneath the product description 210 and on the left-hand side of the semi-structured web page 200, a feature "number of positive reviews" 212 and a feature "number of negative reviews" 214 can be displayed. For instance, reviewers, when reviewing the product displayed on the semi-structured web page 200, can assign a level of satisfaction with the product, for instance, by selecting one through five stars. Thus, the value of the number of positive reviews 212 may be a combination of four and five star reviews, while the value of the number of negative reviews 214 may be the combination of one and two star reviews. It is to be understood that different semi-structured web pages of differing retail web sites may allow for varying levels of review (1 to 5, 1 to 10, etc.), and any suitable mechanism for identifying positive and negative reviews is contemplated. Additionally, if multiple levels of reviews are included in the web page, each separate level can be considered.

Immediately beneath the feature number of negative reviews 214, textual reviews 216 posted by purchasers of the product identified by the product identity 204 may be included. The reviews shown in such reviews 216 may include numerous positive and negative reviews, and may thus include numerous positive and negative terms. Natural language processing can be employed to identify terms that are positive terms and terms that are negative, and such count of positive and negative terms utilized in the reviews 216 can be extracted from the semi-structured web page 200 as features.

Exemplary features of the semi-structured web page 200 that can be utilized by the ranker component 118 when positioning the semi-structured web page 200 in a ranked list of documents can include the value of the number of reviews 206, the value of the social media input 208, the value of the number of positive reviews 212, the value of the number of negative reviews 214, a number of positive terms included in the reviews 216, a number of negative reviews included in the reviews 216, or other suitable features. Further, generally, the values of such features that are utilized to selectively position the structured web page 200 in a ranked list of documents responsive to receipt of a query have no correlation to the text of the query.

Figure 3:
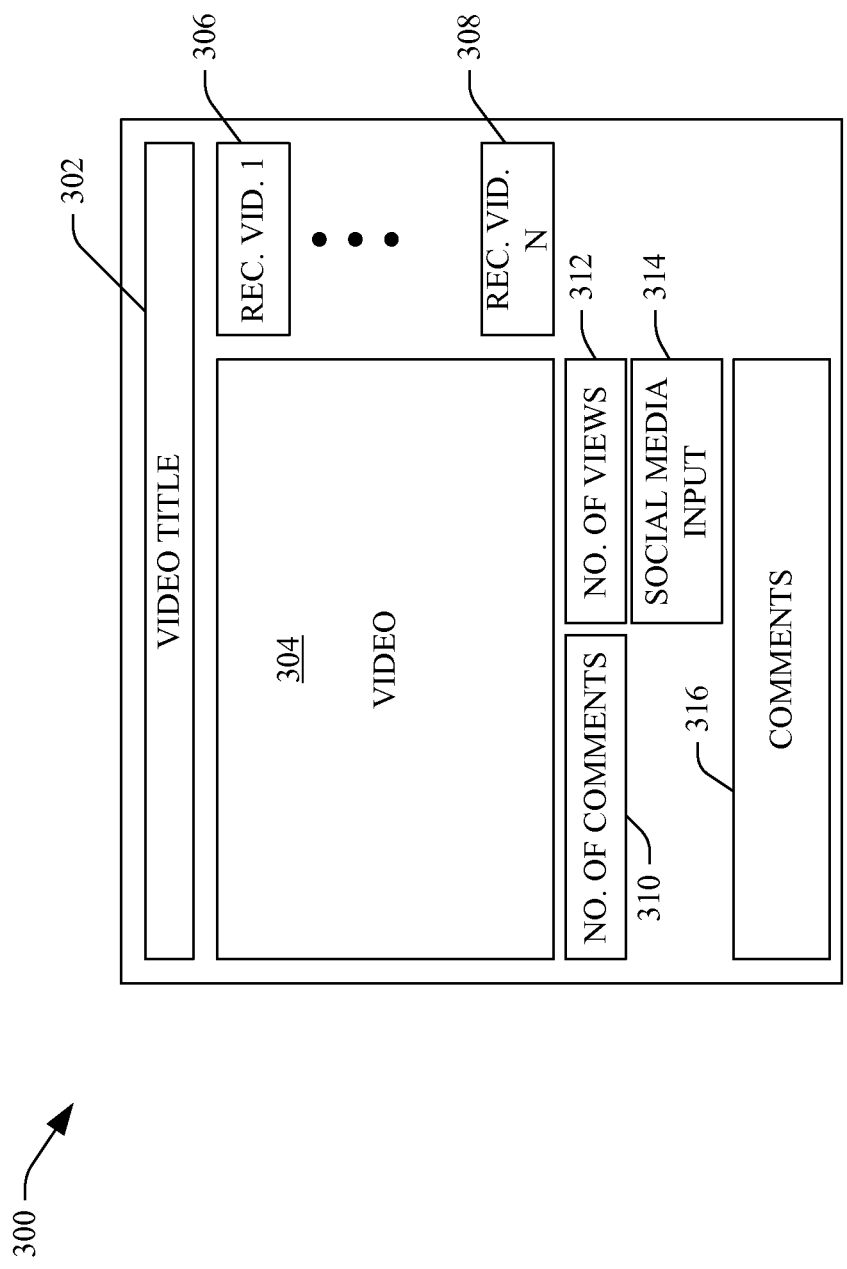
FIG. 3 illustrates an exemplary semi-structured web page that includes information pertaining to a video.

Turning now to FIG. 3, another exemplary semi-structured web page 300 is illustrated. The semi-structured web page 300 is again shown in template form, as other web pages belonging to the web site or similar web sites will have a substantially similar layout. The semi-structured web page 300 may belong to a web site that is configured to present videos to users, wherein different web pages belonging to the web site can feature different videos. Accordingly, the exemplary semi-structured web page 300 includes a video title 302, which is the title of the video. The video title 302 may be shown near the top of the semi-structured web page 300. Below the video title 302, a video 304 that can be viewed by a viewer of the semi-structured web page 300 can be included. For instance, the video 304 may be configured to be streamed to an Internet browser on a computing device. Immediately to the right of the video 304 may be links 306-308 to a plurality of videos that are recommended to the viewer of the video 304. For example, the recommended videos may be similar to the video 304 displayed on the semi-structured web page 300.

Beneath the video 304 and on the left-hand side of the semi-structured web page 300, a feature "number of comments" 310 may be included. This can indicate a number of viewers of the video 304 that have commented on such video 304. To the right of the number of comments 310, a feature "number of views" 312 of the video 304 may be displayed. The value of the number of views 312 may indicate a number of users that have viewed the video 304 on the semi-structured web page 300. A feature "social media input" 314 may be positioned beneath the number of views 312, wherein a value of the social media input 314 can indicate a number of viewers of the video that have indicated by way of the social networking site that they have enjoyed the video 304. Beneath the number of comments 310, the number of views 312, and the social media input 314, comments 316 posted on the semi-structured web page 300 by viewers of the video 304 may be included. As described above, natural language processing techniques can be employed to identify a number of positive comments, a number of negative comments, a number of positive terms included in the comments, and/or a number of negative terms included in the comments.

Responsive to receipt of a query, the ranker component 118 can consider various of the features of the semi-structured web page 300 that are at learned positions on the semi-structured web page 300. For instance, the ranker component 118 can consider a number of the recommended videos 306-308 that are included in the semi-structured web page 300, a value of the number of comments 310, a value of the number of views 312, a value of the social media input 314 and/or a number of positive comments, negative comments, positive terms, and/or negative terms included in the comments 316 of the semi-structured web page 300.

Figure 4:
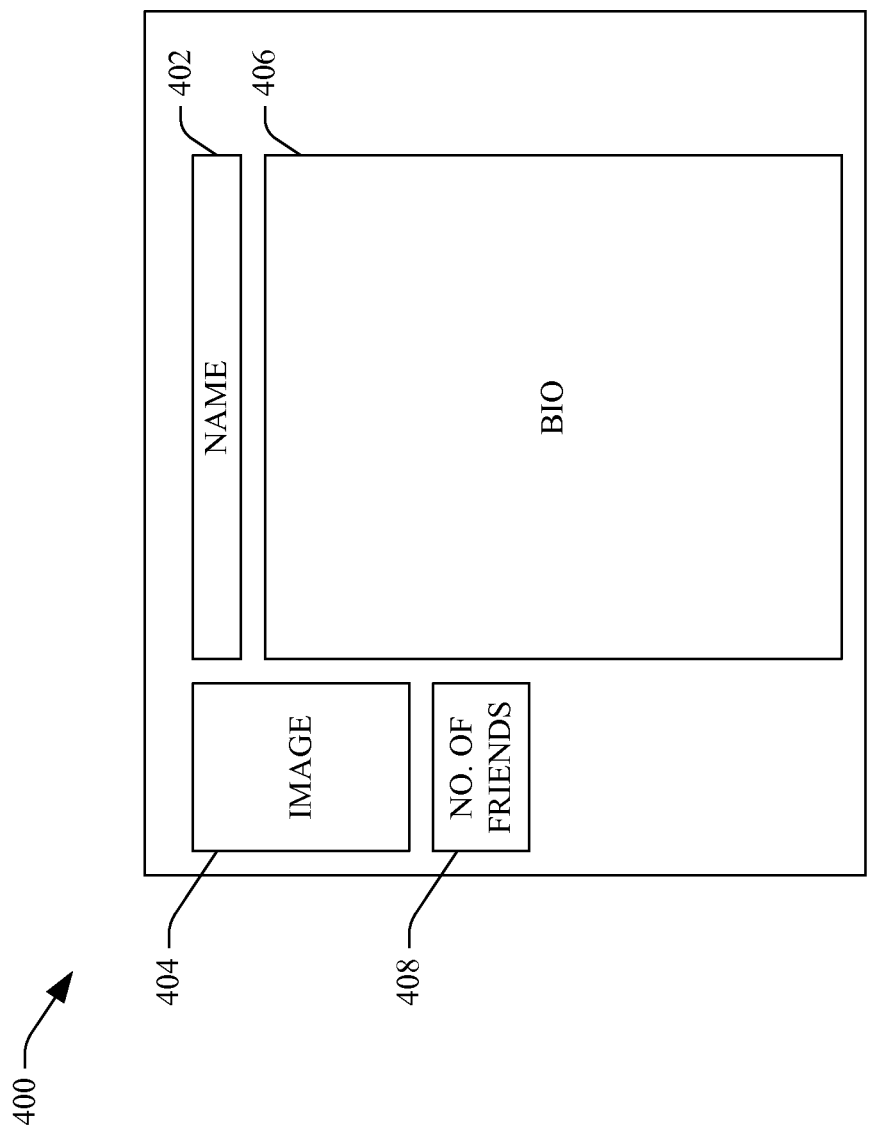
FIG. 4 illustrates an exemplary semi-structured web page that depicts a profile web page of a social networking web site.

Now referring to FIG. 4, another exemplary semi-structured web page 400 that can be included in the data store 102 and retrieved responsive to receipt of a query is illustrated. The semi-structured web page 400 is a web page that is included in a social networking site and may, for instance, be a profile page. The profile page can depict profile information pertaining to a particular user of the social networking web site. Such profile page may have a substantially similar layout to other profile pages of the social networking web site or other social networking sites.

The semi-structured web page 400 includes a name 402 of the entity that is profiled in the semi-structured web page 400. An image 404 that represents the entity named in the name 402 is included in the semi-structured web page 400 to the left of the name 402 and at the upper left hand corner of the semi-structured web page 400. Biographical information 406 is included beneath the name 402 of the profiled entity, wherein such biographical information 406 can indicate interests of the entity that is profiled, location of the entity that is profiled, birthdate of the entity that is profiled, varying interests of the entity that is profiled, etc. A feature "number of friends" 408 beneath the image 404 and to the left of the biographical information 406 is included in the semi-structured web page 400. The value of the number of friends 408 indicates a number of individuals that have agreed to be contacts with the entity profiled in the semi-structured web page 400 on the social networking web site.

When selectively positioning the semi-structured web page 400 amongst a ranked list of search results, the ranker component 118 can consider the values of the number of friends 408, a number of interests included in the biographical information 406, etc. In an alternative embodiment, the social networking web page 400 may be a web page that is configured to display information about an entity that broadcasts messages to subscribers or followers of such entity. Accordingly, the feature "number of friends" 408 may instead be number of subscribers or followers of the entity depicted in the web page 400, and the ranker component 118 can consider such feature when selectively positioning the semi-structured web page 400 amongst a ranked list of documents.

Figure 5:
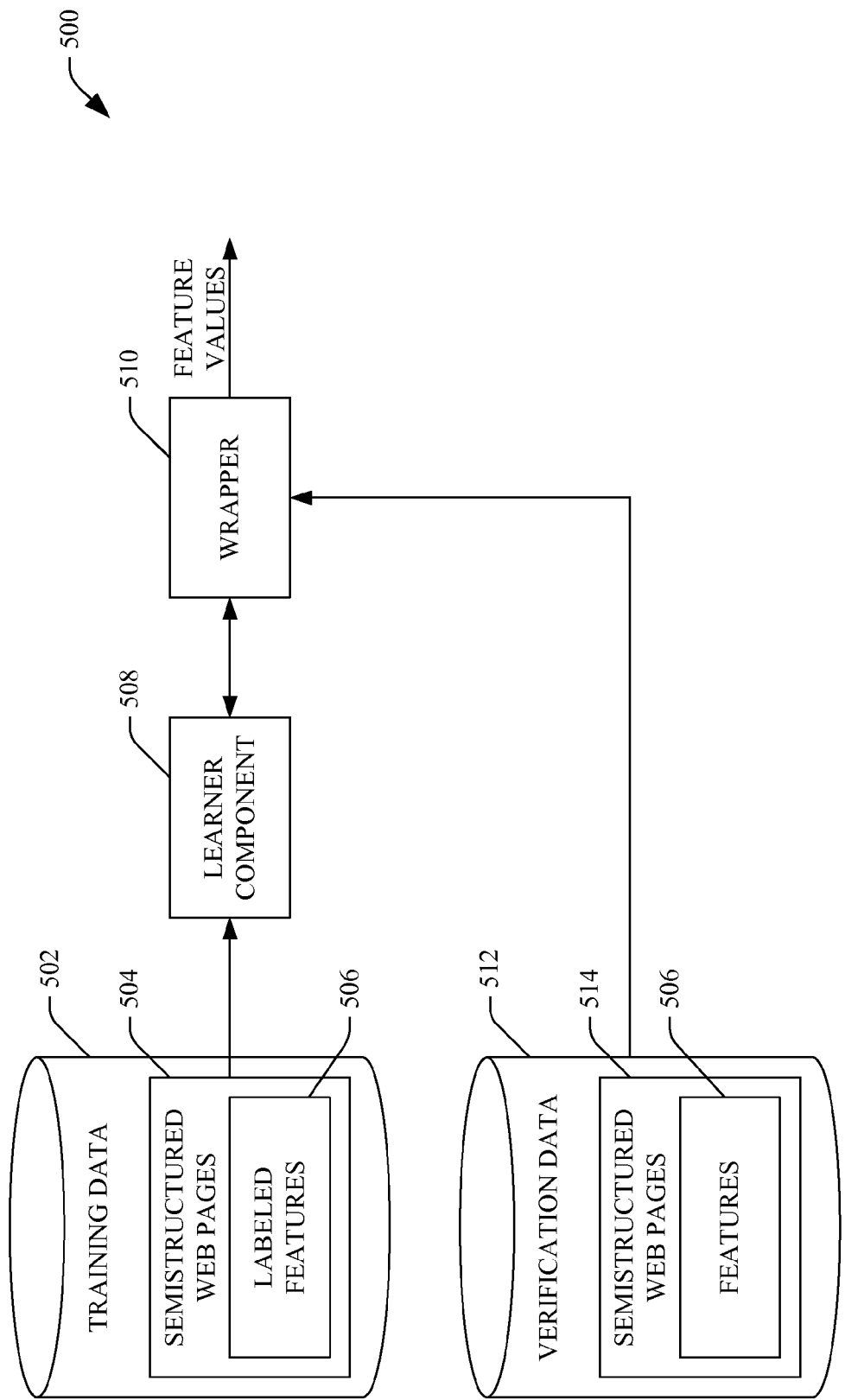
FIG. 5 is a functional block diagram of an exemplary system that facilitates learning a wrapper that can be configured to automatically extract values of certain features across numerous semi-structured web pages.

Now referring to FIG. 5, an exemplary system 500 that facilitates automatically or semi-automatically learning a wrapper that is configured to extract feature values from semi-structured web pages at learned/specified locations on such web pages is illustrated. The system 500 includes a data store 502 that comprises training data. The training data includes a plurality of semi-structured web pages 504 with certain features identified as being features that may be utilized by the ranker component 118 to selectively position semi-structured web pages amongst a ranked list of search results when performing a web search. The semi-structured web pages 504 in the training data may be any of the semi-structured web pages shown and described with respect to FIGS. 2-4. The semi-structured web pages 504 may include a plurality of manually labeled features 506 across the semi-structured web pages 504. For instance, one or more individuals may manually indicate on various semi-structured web pages where features of interest are located. In an example, the semi-structured web pages 504 may be configured to describe and sell certain products, and the labeled features 506 in the semi-structured web pages may indicate a number of reviews of such products, a number of positive reviews of such products, etc.

A learner component 508 can receive the labeled semi-structured web pages 504 and, through wrapper induction, can learn a wrapper 510. The wrapper 510 is a data mining program that is configured to extract content from semi-structured web pages and translate such content into a suitable form (relational form). Formally, the wrapper 510 is a function that extracts content from a semi-structured web page and formats the content to a set of desired tuples. A tuple output by the wrapper 510 can include data that identifies a web page, and values of features extracted from the web page. In an example, the learner component 508 can utilize supervised learning to learn extraction rules that are included in the wrapper 510.

The system 500 may further include another data store 512 that includes verification data, wherein the verification data is provided to the wrapper 510 to ascertain the operability of the wrapper 510. The verification data 512 includes semi-structured web pages 514 that include the features 506 that were subjected to labeling in the semi-structured web pages 504 in the training data. The wrapper 510 automatically extracts features from the semi-structured web pages in the verification data and such features can be manually analyzed to ascertain the performance of the wrapper 510. If the wrapper 510 is successfully extracting the appropriate features from the semi-structured web pages in the verification data, then the wrapper 510 can be deployed to automatically identify features and extract values for features across a plurality of semi-structured web pages. If, however, the wrapper 510 is not successfully extracting features of interest at a sufficient success rate, then additional training can be undertaken.

The system 500 has been described as utilizing supervised learning to generate or learn the wrapper 510. It is to be understood, however, that over time, unsupervised pattern mining techniques can be employed that automatically extracts features of interest from semi-structured web pages across the World Wide Web. In this approach, web sites can be analyzed for fixed templates, and discovery of such templates can enable the wrapper 510 to be learned in an unsupervised fashion.

Figure 6:
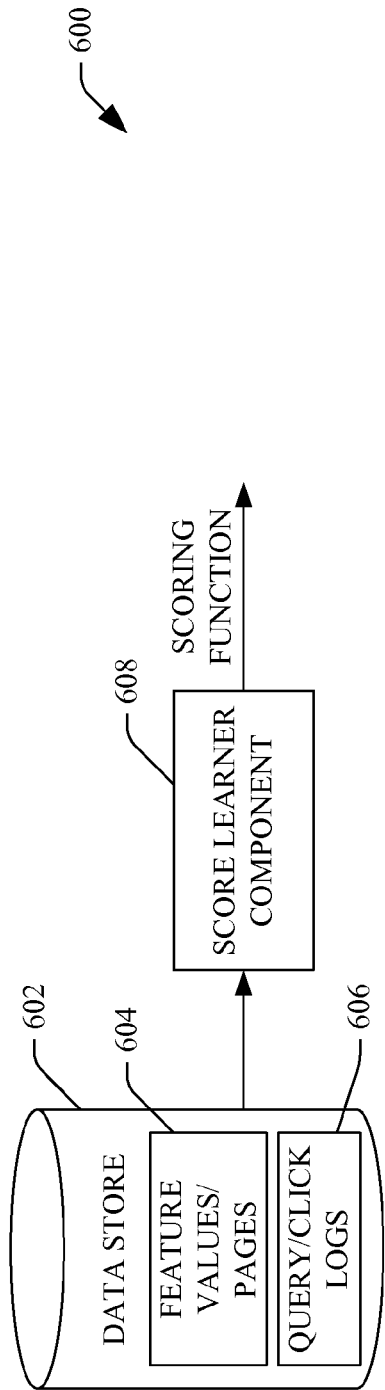
FIG. 6 is a functional block diagram of an exemplary system that facilitates learning a scoring function that assigns scores to a feature that indicate an importance of the feature to semi-structured web pages with respect to information retrieval.

Referring now to FIG. 6, an exemplary system 600 that facilitates learning a scoring function to assign scores (weights) to features that are indicative of the importance of the features with respect to information retrieval relevance is illustrated. The system 600 includes a data store 602 that comprises feature values/pages 604, wherein the feature values/pages 604 are tuples that include identities of the semi-structured web pages and values of features extracted from the semi-structured web pages (in an order that identifies the identifies of the features). The data store 602 further comprises query/click logs 606 that indicate, for a given query employed to retrieve a semi-structured web page, whether or not a user clicked on such semi-structured web page. The query/click log 606 can also include data that indicates whether the user remained on the semi-structured web page upon selecting the web page from a ranked list of documents, whether they started a new search session subsequent to viewing the semi-structured web page that was clicked on, etc.

The system 600 may further comprise a score learner component 608 that can learn a function that assigns scores to features extracted from semi-structured web pages, wherein the scores are indicative of the importance of such features to the positioning of semi-structured web pages in search results. For example, the score learner component 608 can analyze the feature values/pages 604 together with the query/click log 606 and ascertain that generally, for semi-structured web pages that include product information, web pages that include a relatively large number of positive reviews are selected more by users than web pages that include a relatively small number of positive reviews. This can indicate that the feature "number of reviews" is relatively important to positioning of semi-structured web pages in a ranked list of search results, and the scoring function output by the score learner component 608 can weight such feature values accordingly. Subsequent to the score learner component 608 learning the scoring function (through utilization of any suitable machine learning techniques), the scoring function can be applied to the feature values for the respective semi-structured web pages. This results in the generation of scores for the feature values of the features extracted from the plurality of semi-structured web pages.

Figure 7:
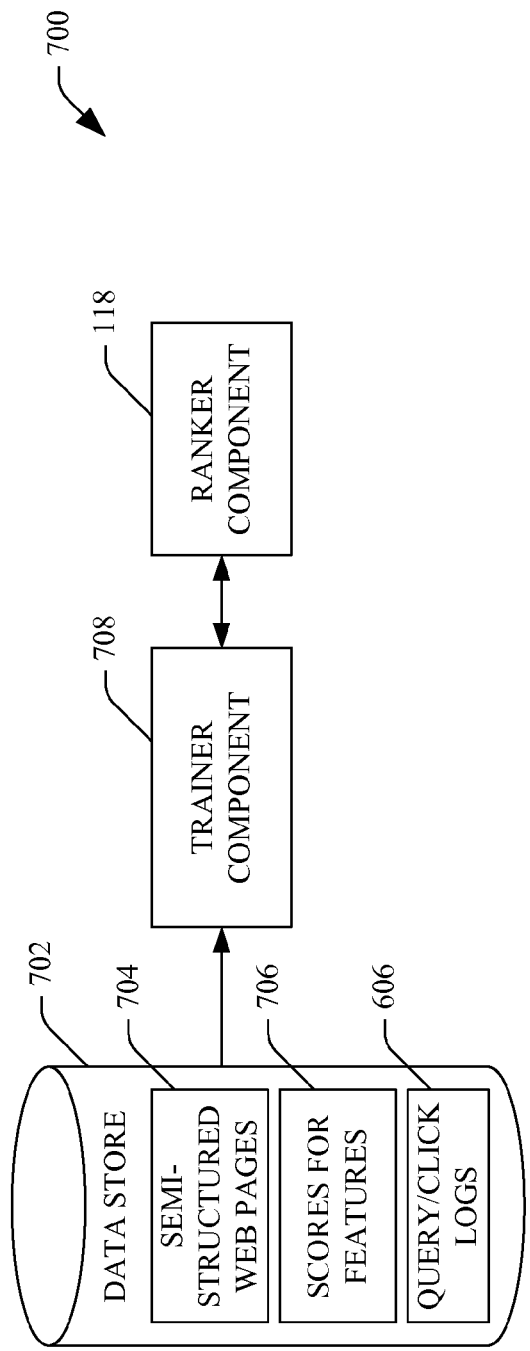
FIG. 7 is a functional block diagram of an exemplary system that facilitates training a ranker component based at least in part upon scores assigned to semi-structured web pages that include automatically extracted feature values.

Turning now to FIG. 7, an exemplary system 700 that facilitates training the ranker component 118 to selectively rank documents retrieved during a search based at least in part upon values of features extracted from learned positions on semi-structured web pages is illustrated. The system 700 comprises a data store 702 that includes a plurality of semi-structured web pages 704, scores assigned to features of the semi-structured web pages 706, and the query/click logs 606. Additionally, the data store 702, while not shown, may include scores assigned to other features that may be included in web pages that are considered by the ranker component 118 when ranking search results. Pursuant to an example, the ranker component 118 may be a decision tree based ranker.

A trainer component 708 can receive the identities of the semi-structured web pages 704 (and other web pages), the scores for the features 706 included in the semi-structured web pages 704, and the query/click log 606. The trainer component 708 can train the ranker component 118 such that the ranker component 118 takes into consideration values of the features that have been described above when ranking search results that are output responsive to receipt of a user query.

With reference now to FIGS. 8-11, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Figure 8:
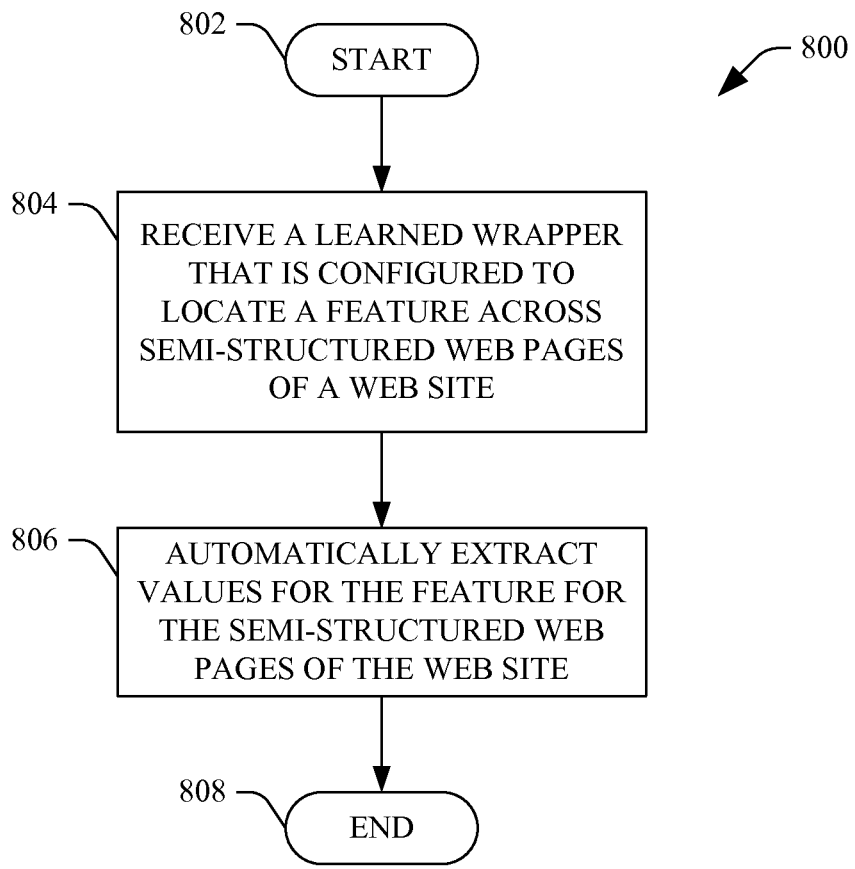
FIG. 8 is a flow diagram that illustrates an exemplary methodology for automatically extracting values for a certain feature in a semi-structured web page.

Turning now to FIG. 8, an exemplary methodology 800 that is configured to automatically extract values of certain features from semi-structured web pages is illustrated. The methodology 800 starts at 802, and at 804 a learned wrapper that is configured to locate a feature that exists across semi-structured web pages of a web site or web sites is learned. For example, the wrapper can be learned such that the wrapper extracts features such as number of reviews of a product on a semi-structured web page, number of positive reviews of a product on a semi-structured web page, number of negative reviews of a product on a semi-structured web page, etc. Other exemplary features that can be extracted from semi-structured web pages have been set forth above.

At 806, the wrapper is used to automatically extract values for the feature across the semi-structured web pages of the web site or sites. The methodology 800 completes at 808.

Figure 9:
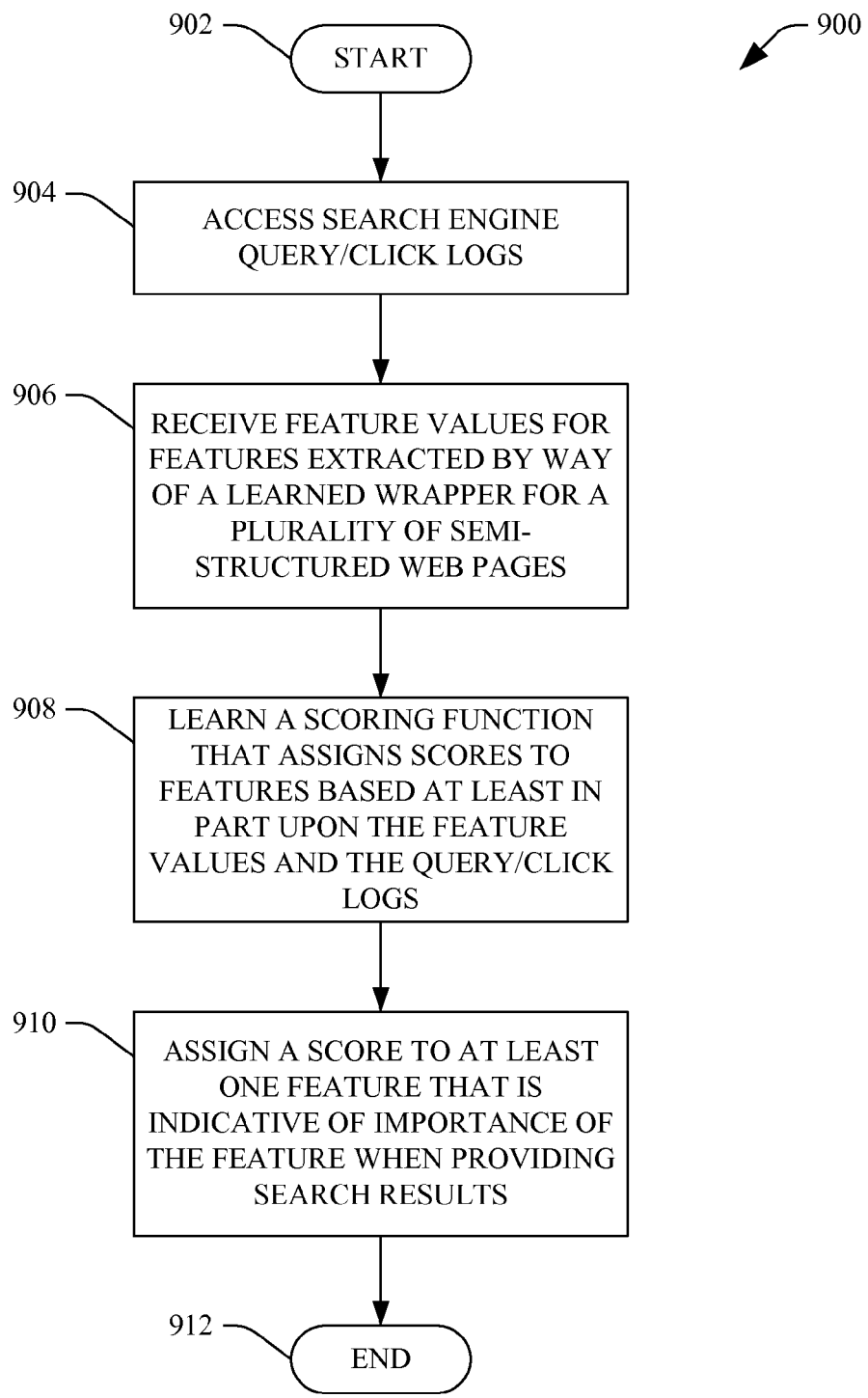
FIG. 9 is a flow diagram that illustrates an exemplary methodology for assigning an importance score to a semi-structured web page that indicates an importance of a feature with respect to information retrieval.

Now referring to FIG. 9, an exemplary methodology 900 that facilitates assigning a score to at least one feature that is indicative of relevance of the feature to position of semi-structured web pages in a ranked list of search results is illustrated. The methodology 900 starts at 902, and at 904 search engine query/click logs are accessed. At 906, values for the features extracted by way of a learned wrapper are received for a plurality of semi-structured web pages. At 908, a scoring function that assigns scores to features based at least in part upon the feature values and the query/click logs is learned. For instance, query/click logs can include data that is indicative of whether a user has selected a semi-structured web page after issuing a query, wherein such semi-structured web page includes a certain feature. Thus, a correlation between feature values and desired position amongst search results can be ascertained. In a particular example, a model can be learned over set of features to predict a popularity score for a document, wherein user clicks can be utilized to determine popularity, as they are indicative of judgments of users. At 910, a score is assigned to at least one feature that is indicative of the importance of the feature when selectively ranking search results for provision to a user. For instance, the score can be assigned during training of the ranker, which is trained based upon human judgments given for query-URL pairs. More specifically, the scoring function can be executed over a particular feature value, which can weight the feature value in accordance with the importance of the feature relative to a ranked list of search results. The methodology 900 completes at 912.

Figure 10:
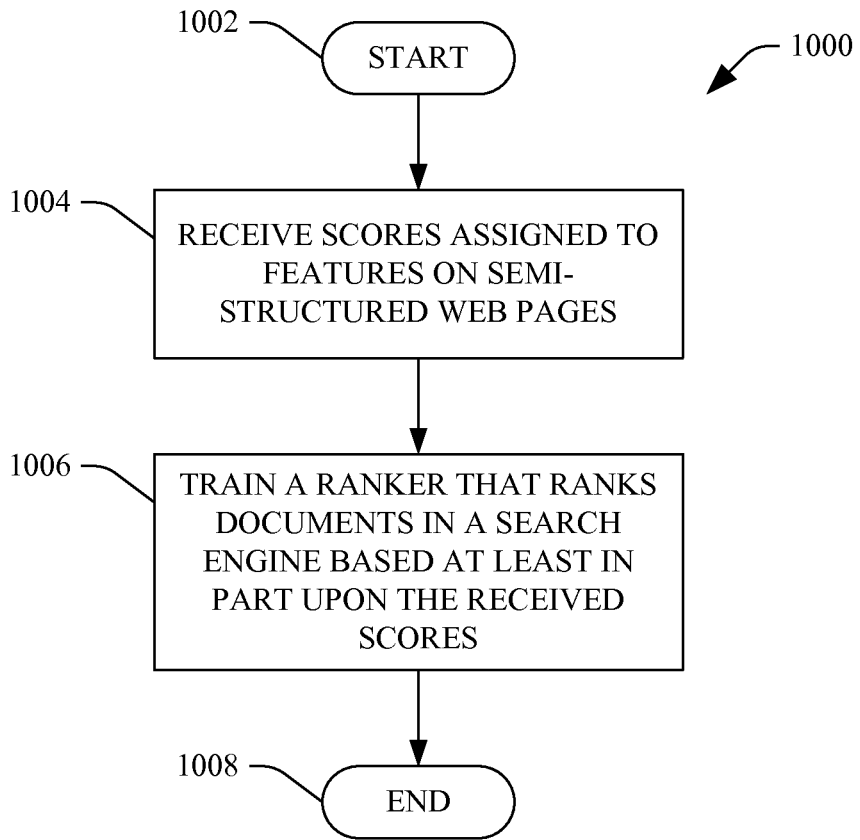
FIG. 10 is a flow diagram that illustrates an exemplary methodology for training a ranker that ranks documents based at least in part upon importance scores assigned to web pages with respect to certain features.

Now referring to FIG. 10, an exemplary methodology 1000 that facilitates training a ranker that is configured to output a ranked list of search results responsive to receipt of a query is illustrated. The methodology 1000 starts at 1002. At 1004, scores assigned to features on semi-structured web pages are received. Additionally, scores assigned to features other than the ones described herein can be received. At 1006, a ranker that is configured to rank documents in a search engine is trained based at least in part upon the received scores. The methodology 1000 completes at 1008.

Figure 11:
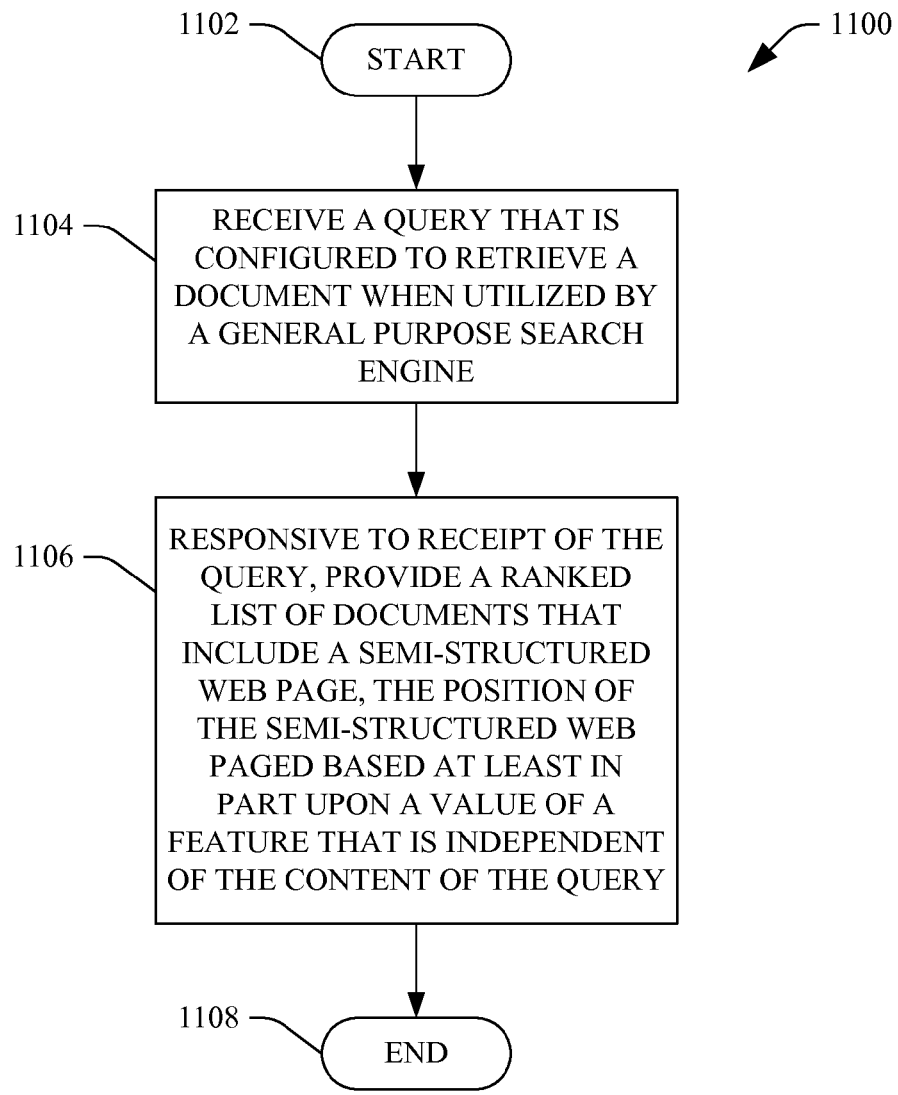
FIG. 11 is a flow diagram that illustrates an exemplary methodology for outputting a ranked list of documents to a user responsive to receipt of a query.

Now turning to FIG. 11, an exemplary methodology 1100 that facilitates outputting a ranked list of search results responsive to receipt of a query is illustrated. The methodology 1100 starts at 1102, and at 1104 a query that is configured to retrieve a document when received by a general purpose search engine is received. For instance, the query may include a word, a phrase, some alphanumeric string, etc. At 1106, responsive to receipt of the query, a ranked list of documents is provided to a user, wherein the ranked list of documents includes a semi-structured web page that is positioned in the ranked list of documents based at least in part upon a value of a feature that has been extracted from a learned position in the web page by a learned wrapper. Additionally, the value of the feature is independent of content of the query. The methodology 1100 completes at 1108.

Figure 12:
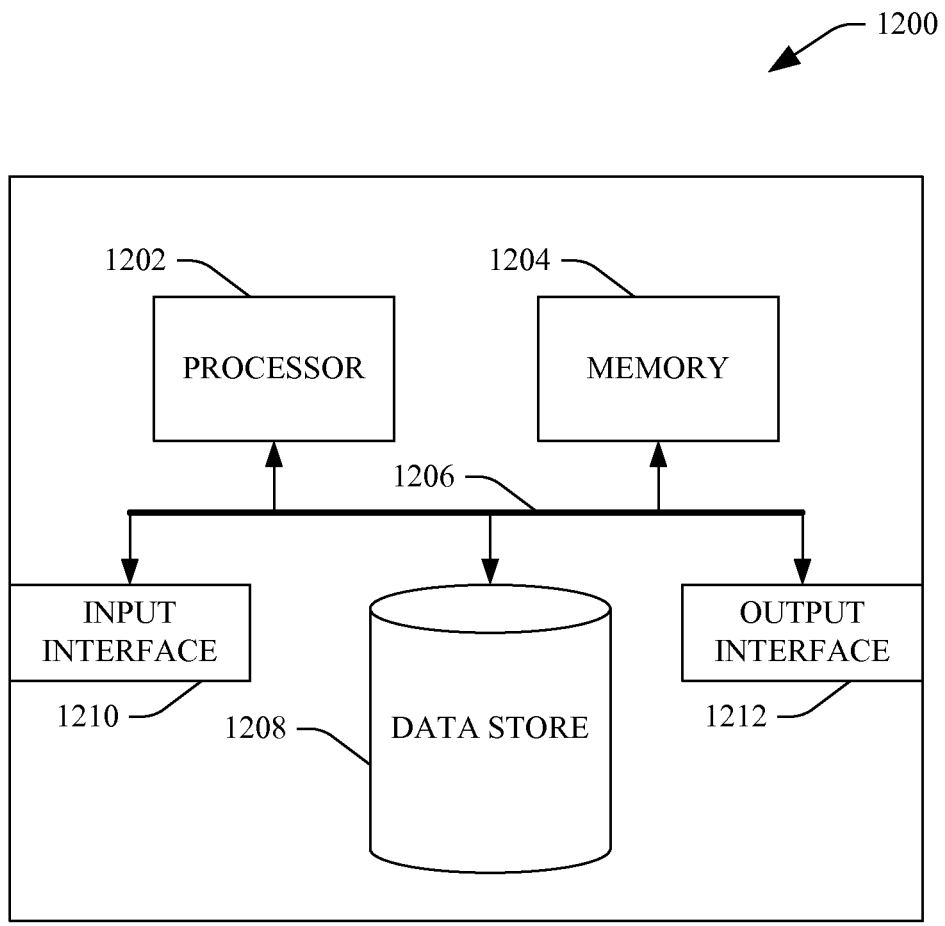
FIG. 12 is an exemplary computing system

Now referring to FIG. 12, a high-level illustration of an exemplary computing device 1200 that can be used in accordance with the systems and methodologies disclosed herein is illustrated. For instance, the computing device 1200 may be used in a system that supports automatically extracting values of features at learned positions of semi-structured web pages. In another example, at least a portion of the computing device 1200 may be used in a system that supports training a ranker that is configured to output a ranked list of documents. In still yet another example, the computing device 1200 may be employed in a system that supports outputting a ranked list of search results based at least in part upon features that are automatically extracted from semi-structured web pages. The computing device 1200 includes at least one processor 1202 that executes instructions that are stored in a memory 1204. The memory 1204 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store features, feature values, etc.

The computing device 1200 additionally includes a data store 1208 that is accessible by the processor 1202 by way of the system bus 1206. The data store 1208 may be or include any suitable computer-readable storage, including a hard disk, memory, etc. The data store 1208 may include executable instructions, features, feature values, web pages, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates ranking documents with respect to a received query, the method comprising:
    at a general purpose search engine, receiving the query, the query configured to retrieve at least one document that is indexed by the general purpose search engine; and
    causing a processor to output a ranked list of documents based at least in part upon the query, the ranked list of documents comprising a semi-structured web page, a position of the semi-structured web page in the ranked list of documents based at least in part upon a value of a feature that is extracted from the semi-structured web page at a learned location in the semi-structured web page that is known to include the feature, wherein the position of the semi-structured web page in the ranked list of documents is independent of any correlation between text of the query and the value of the feature.

2. The method of claim 1, wherein the semi-structured web page is a retailer page that describes a product, and wherein the feature is at least one of total number of reviews posted on the semi-structured web page by purchasers of the product, total number of positive reviews posted on the semi-structured web page by purchasers of the product, or total number of negative reviews posted on the semi-structured web page by purchasers of the product.

3. The method of claim 1, wherein the semi-structured web page is a web page that includes a video, and wherein the feature is a number of views of the video by viewers of the video on the web page.

4. The method of claim 1, wherein the semi-structured web page is a profile page of an entity on a social networking site, and wherein the feature is a number of contacts of the entity.

5. The method of claim 1, wherein the semi-structured web page is a profile page of an entity on a social network site, and wherein the feature is a number of individuals that subscribe to broadcasts generated by the entity.

6. The method of claim 1, wherein content of the semi-structured web page fails to conform to structure of a relational database but comprises a pattern that is consistent across a plurality of other semi-structured web pages.

7. The method of claim 1, further comprising:
    automatically extracting features from a plurality of semi-structured web pages, wherein the feature is automatically extracted from the semi-structured web page at the learned location.

8. The method of claim 7, wherein wrapper induction is employed to learn a wrapper that automatically or semi-automatically extracts the features from the plurality of semi-structured web pages.

9. The method of claim 8, further comprising:
learning a function that assigns scores to the features, wherein a ranker of the general purpose search engine is trained based at least in part upon scores output by the function.

10. The method of claim 9, wherein the ranker comprises at least one decision tree.

11. A system that facilitates outputting a ranked list of search results responsive to receipt of a query, the system comprising:
a receiver component that receives the query; and
a ranker component that outputs a ranked list of documents responsive to receipt of the query, the ranked list of documents comprising a semi-structured web page at a position amongst the ranked list of documents, the position amongst the ranked list of documents based at least in part upon a value of a feature that is at a learned location in the semi-structured web page, the position of the semi-structured web page amongst the ranked list of documents being independent of any correlation between the query and the value of the feature.

12. The system of claim 11 comprised by a general purpose search engine.

13. The system of claim 11, the ranker component comprising a computer-executable decision tree.

14. The system of claim 11, wherein the semi-structured web page is a web page that is configured for sale of a product, and wherein the feature is one of a number of reviews posted on the web page by purchasers of the product, a number of positive reviews posted on the web page by purchasers of the product, or a number of negative reviews posted on the web page by purchasers of the product.

15. The system of claim 11, wherein the semi-structured web page is a web page that is configured for sale of a product, and wherein the feature is one of a number of terms labeled as positive in reviews of the product posted on the web page by purchasers of the product or a number of terms labeled as negative in reviews of the product posted on the web page by purchasers of the product.

16. The system of claim 11, wherein the semi-structured web page is a web page that is configured to present a video to a user, and wherein the feature is a number of views of the video by way of the web page.

17. The system of claim 11, wherein the semi-structured web page is a web page that includes a profile of a particular individual, and wherein the feature is a number of contacts of the individual in a social networking web site.

18. The system of claim 11, wherein the semi-structured web page is a web page that includes a profile of a particular entity, and wherein the feature is a number of other individuals that have subscribed to receive broadcasts generated by the particular entity.

19. The system of claim 11, further comprising a learner component that learns a wrapper by way of wrapper induction, wherein the wrapper automatically extracts features from semi-structured web pages.

20. A computer-readable medium comprising instructions that, when executed by a processor, cause the processor to perform acts comprising:
receiving a query;
extracting a value of a feature from a semi-structured web page independent of content of the query, the feature being one of:
a number of reviews posted on the semi-structured web page by purchasers of a product that is displayed on the web page;
a number of positive reviews posted on the semi-structured web page by purchasers of the product that is displayed on the web page;
a number of negative reviews posted on the semi-structured web page by purchasers of the product that is displayed on the web page;
a number of views of a video that is embedded on the web page;
a number of contacts of an entity whose profile is included on the web page; or
a number of subscribers of an entity that broadcasts messages that are displayed on the web page;
responsive to receiving the query, providing a ranked list of search results, the ranked list of search results comprising a plurality of documents displayed in a particular order, the plurality of documents comprising the semi-structured web page that is at a certain position in the particular order, wherein the certain position in the particular order is based at least in part upon the value of the feature extracted from the semi-structured web page, and wherein the certain position in the particular order is independent of any correlation between the value of the feature and the query.

* * * * *